United States Patent [19]

Holmström

[11] 4,312,255

[45] Jan. 26, 1982

[54] ARRANGEMENT FOR EDGE TRIMMING OF A MOVING MATERIAL WEB

[75] Inventor: Sven N. H. Holmström, Löberöd, Sweden

[73] Assignee: Tetra Pack International AB, Lund, Sweden

[21] Appl. No.: 98,046

[22] Filed: Nov. 28, 1979

[30] Foreign Application Priority Data

Dec. 7, 1978 [SE] Sweden .............................. 7812597

[51] Int. Cl.³ .......................................... B65H 35/02
[52] U.S. Cl. ....................................... 83/582; 83/433; 83/856
[58] Field of Search ................ 83/433, 434, 582, 428, 83/856, 858

[56] References Cited

U.S. PATENT DOCUMENTS

| 1,299,335 | 4/1919 | Hazeltine | 83/433 X |
| 3,121,363 | 2/1964 | Simjian | 83/428 |
| 3,238,831 | 3/1966 | Porter | 83/433 |
| 3,682,031 | 8/1972 | Degelleke et al. | 83/433 |

Primary Examiner—James M. Meister
Attorney, Agent, or Firm—Burns, Doane, Swecker & Mathis

[57] ABSTRACT

An edge trimming device is provided for the trimming of moving laminate webs which include a carrier layer and at least one outer layer. A cutting device is supported by a resilient support so that the cutting device is capable of lateral movement while remaining perpendicular to the laminate web. The cutting device trims the edge of the laminate web as it passes by the cutting device. Preferably, the cutting device cuts the outer layer which extends from a longitudinal edge of the carrier layer.

5 Claims, 3 Drawing Figures

U.S. Patent   Jan. 26, 1982   4,312,255
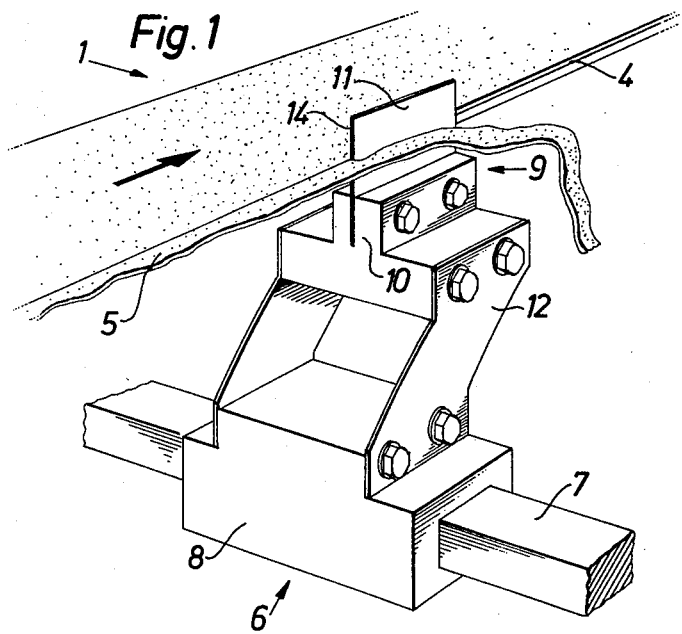
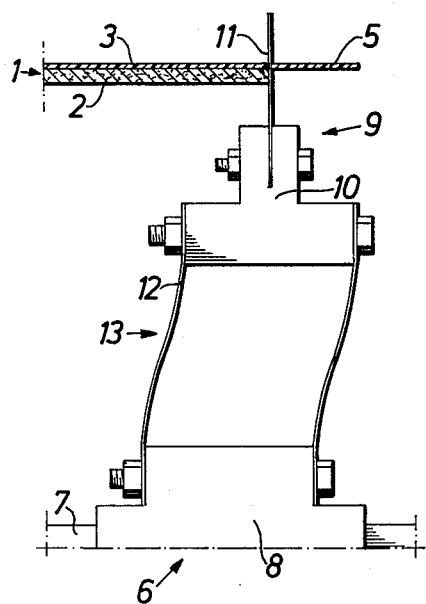 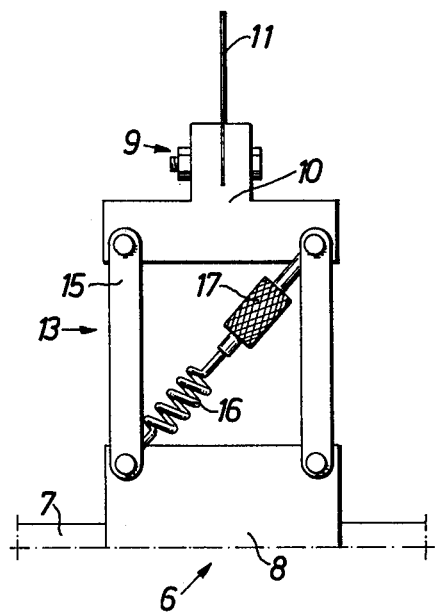

4,312,255

ARRANGEMENT FOR EDGE TRIMMING OF A MOVING MATERIAL WEB

The present invention relates to an arrangement for the edge trimming of a moving material web which comprises a carrier layer web and a laminate layer extending outside the longitudinal edge of the carrier layer.

In the manufacture of laminated packing material, e.g. of the type which is used for the manufacture of non-returnable packages for milk, a material web is fed through a laminating machine or laminator wherein it is coated during continued advance with different laminating layers. The material web which is fed to the laminator is constituted of a relatively strong paper or cardboard web which forms the base of the laminated material and is designated the carrier layer of the laminate. This carrier layer is coated in the laminator on one or on both sides with thin layers of homogeneous, thermoplastic material which is applied onto the passing web through elongated extrusion dies extending transversely over the moving carrier layer web. The plastic material is in a heated, melted condition and can therefore be easily attached to the passing carrier layer web. To ensure that the total width of the carrier layer web is coated with plastics, the extrusion die is given a length which somewhat exceeds the width of the web. This means that the thermoplastic layer after lamination will extend a little outside the longitudinal edges of the carrier layer. After completed lamination, that is to say, when the desired number of layers of thermoplastic (possibly also aluminium foil or other material) has been applied to the carrier layer web this excess material or edge zone extending beyond the edge of the carrier layer web, formed by the lamination layer is trimmed off. This edge trimming process is carried out with the help of cutting discs, placed on both sides of the laminate web, which are installed so that they completely cut off the excess material close to the edge of the carrier layer web.

This edge trimming is associated with certain difficulties which primarily are due to the fact that the rapidly moving material web has a tendency to wander a little sideways while moving through the machine. This side movement is difficult to prevent and means that even if the cutting discs are set correctly they will sometimes cut into the carrier layer and sometimes leave a portion of the waste material edge of the carrier layer uncut. Continuous monitoring and automatic adjustment of the mutual position of cutting discs and material web depending on the movement of the web has been found to reduce these problems, but the necessary equipment for carrying out such a control is very complicated and expensive.

It is desirable therefore to produce an arrangement for the edge trimming of a moving material web which arrangement is simple, effective and inexpensive and is not subject to the disadvantages associated with other arrangements for the same purpose.

It is an object of the present invention to provide an arrangement for edge trimming of a moving material web which arrangement automatically adapts its position according to the wandering of the material web sideways and accurately cuts off the edge zone of the laminate layer directly by the longitudinal edge of the carrier layer web.

It is a further object of the present invention to provide an arrangement for edge trimming of a moving material web which arrangement is uncomplicated, reliable and inexpensive in its manufacture and maintenance.

These and other objects have been achieved in accordance with the invention by an arrangement for edge trimming of a moving material web which comprises a carrier layer web and a laminate layer extending outside the longitudinal edges of the same being given the characteristic that an element for the trimming off of the edge zone of the laminate layer extending outside of the web edge is movable in the transverse direction of the web and is adapted so that through the action of a spring element it is made to rest against the edge of the carrier layer web.

The arrangement in accordance with the invention will be described in detail in the following with special reference to the enclosed schematic drawing.

FIG. 1 is a pictorial view of a preferred embodiment of the arrangement in accordance with the invention in operation on a moving laminate web.

FIG. 2 is an end view of the arrangement in accordance with FIG. 1.

FIG. 3 is an end view of a second embodiment of the arrangement in accordance with the invention.

In FIG. 1 is shown the arrangement in accordance with the invention in operation on a laminate web 1 which comprises a carrier layer 2 (FIG. 2) of relatively thick paper and a laminate layer 3 applied to the same which is relatively thin and consists of homogeneous, thermoplastic material. The laminate layer 3 extends a little outside of the edges of the carrier layer 2 and forms an edge zone 5 of waste material situated outside the longitudinal edge 4 of the carrier layer 2. The laminate web 1 usually has edge zones 5 like this on either side, but for the sake of greater clarity the edge zone 5 as well as the arrangement in accordance with the invention are shown only on one side of the laminate web.

The arrangement in accordance with the invention which is indicated by reference numeral 6 is carried by a guide bar 7 extending transversely in relation to the laminate web 1. The arrangement 6 comprises a slide 8, which is movable in transverse direction to the web along the guide bar situated at a little distance underneath the laminate web and the arrangement can be locked in the desired position on the guide bar 7 by means of locking elements arranged in the slide 8.

The arrangement 6 comprises further a cutting element 9 which consists of a blade holder 10 of a substantially T-shaped cross-section and a cutting blade, together with leaf springs 12 connecting to the slide 8 as well as to the cutter element 9. By virtue of the flexibility of the leaf springs, these, together with the slide 8 and the cutter element 9, form a kind of flexible parallelogram assembly 13 which can be seen most clearly from FIG. 2.

The cutting blade 11 is so connected to the holder 10 that its cutting edge 14 extends substantially at right angles to the transverse plane of the laminate web 1. The cutting blade 11 is moreover so oriented that it is parallel to the leaf springs 12 when these are in a position where they are not acted upon by external forces, that is to say, when they are straight.

In FIG. 1 and more clearly in FIG. 2 is shown how the arrangement in accordance with the invention operates in the edge trimming of a moving laminate web. The laminate web 1 is shown in section and it is clearly evident that it is made up of the relatively thick carrier layer 2 and the laminate layer 3 of relatively thin plastic material applied to the carrier layer 2. The edge 4 of the carrier layer 2 indicates the final edge line of the web. The edge zone 5 of the laminate layer 3 extending beyond the edge 4 constitutes waste material which is to be cut off with the help of the arrangement in accordance with the invention.

The arrangement in accordance with the invention is intended to be installed in existing laminating machines so that the laminate web 1 immediately after application of the laminate layer 3 passes the arrangement in accordance with the invention. At the start of production the machine is set in motion and the leading end of the laminate web is led past the arrangement in accordance with the invention, which in order to facilitate the steering of the leading end of the laminate web is in such a position on the guide bar 7 that the web can freely pass. When the laminate web 1 moves at the desired speed and web tension, the arrangement 6 is shifted in the direction towards the laminate web 1 so that the cutting edge 14 of the cutting blade 11 successively commences to cut into the projecting edge zone 5 of the laminate web. When the slide 8 is straight underneath the straight-cut edge 4 of the carrier layer 2, the cutting blade 11 installed perpendicularly above the center of the slide 8 will come to rest with one of its lateral faces against the edge 4 of the carrier layer 2. From this position the slide 8 is shifted further a small distance in the direction towards the center of the laminate web 1. Owing to the cutting blade 11 resting against the relatively rigid carrier layer 2 the cutting element 9 is hindered from being moved and from traveling along the slide 8. Instead the leaf springs 12 will yield and assume the slightly S-shaped position which is shown in the drawing. In this position the slide 8 is locked on the guide bar 7. The cutting blade 11 now rests against the edge 4 of the carrier layer 2 under a certain force determined by the springs and the position of the slide 8. This force is sufficient to ensure that the cutting blade 11 trims off the edge zone 5 directly by the edge 4 of the carrier layer, at the same time as making it possible for the cutting blade 11 to follow when the laminate web moves or "wanders" sideways. On movement of the laminate web 1 in side direction the leaf springs 12 will be bent to a greater or lesser degree, but the cutting blade owing to its "parallelogram suspension" will always be at right angles with the transverse plane of the laminate web 1.

The spring characteristic of the leaf springs 12 must be adapted so that the force urging the cutting blade 11 to rest against the carrier layer 2 will be relatively unchanged in spite of varying degree of deformation of the leaf springs 12. The suitable spring characteristic has proven to be relatively non-critical and may be determined relatively simply by means of practical experiments. The cutting blade 11 should be ground symmetrically, since in case of one-sided grinding the cutting edge 14 tends to cut obliquely and not follow the edge 4 of the carrier layer 2 in the desired manner. The displacement of the slide underneath the laminate web 1, that is to say, the distance the slide 8 is shifted sideways beyond the movement of the cutting element 9, must of course be greater than the maximum wandering of the laminate web 1 sideways away from the cutting element 9. However, even this parameter is fairly uncritical and can be determined simply by trial and error.

A further embodiment of the arrangement in accordance with the invention is shown in FIG. 3. The arrangement similar to the embodiment described earlier has a slide 8 which is movable along a guide bar 7. Moreover, the arrangement comprises a cutting element 9 which consists of a blade holder 10, a cutting blade 11 and bolts connecting the cutter holder to the cutting blade.

The cutting element 9 and the slide 8 are connected with the help of parallelogram links 15 which are in articulated connection with the cutting element 9 as well as with the slide 8. The parallelogram assembly 13 thus formed is acted upon in its one direction by means of a spiral spring 16 which extends diagonally between the cutting element 9 and the slide 8. The spring force is adjustable by means of a regulating device 17 arranged in series with the spiral spring 16.

The embodiment of the arrangement in accordance with the invention shown in FIG. 3 and described above works in the same manner as the preferred embodiment, so that the method of operation does not have to be described in detail.

Further embodiments of the arrangement are possible. For example, the cutting element 9 and the slide 8 may be connected rigidly with one another or made in one piece, and the required spring force may instead be generated with the help of a spring which with its one end is connected to the slide and with its other end is connected to the guide bar or an element which is lockable in the desired position along the same.

The arrangement in accordance with the invention can be used for the trimming off of edge zones on both sides of a traveling laminate web. Naturally, the arrangement can also be used for the separation of two or more carrier layer webs moving in parallel which are connected by means of a laminated layer which covers all the webs. By allowing a cutting blade to cut along one edge of each carrier layer web, the webs will be provided one clean-trimmed edge and with one edge with an evenly trimmed edge zone attached to it, which for example may be folded over and utilized for the sealing of the edge zone of the carrier layer. Since the preferred embodiment of the arrangement in accordance with the invention consists exclusively of elements which are rigidly connected to one another, neither swivel nor sliding movements will occur during application thus the arrangement will be wholly frictionless. This means that the force urging the cutting blade against the carrier layer edge can be minimized. This is a great advantage since any risk of the cutting blade cutting into the carrier layer will consequently be appreciably reduced. As this design also ensures that the cutting blade is always maintained at right angles to the carrier layer web the said risk is further reduced so that in practice the problem is wholly eliminated.

As is evident from the above description the arrangement in accordance with the invention is particularly simple in its construction and is therefore inexpensive to manufacture and to maintain. Moreover, the arrangment has proven in practice to operate considerably more accurately and more reliably than cutting elements used previously. This applies in particular to the preferred embodiment which owing to the total absence of swivel or sliding movements during operation eliminates the most likely causes of difficulties.

The principles, preferred embodiments and modes of operation of the present invention have been described in the foregoing specification. The invention which is intended to be protected herein should not be construed as limited to the particular forms disclosed, since these are to be regarded as illustrative rather than restrictive. Variations and changes may be made by those skilled in the art without departing from the spirit of the present invention.

I claim:

1. An edge trimming device for use in trimming a moving laminate web which includes a carrier layer and at least one outer layer comprising:

cutting means for cutting an edge portion of the laminate web;

resiliently biased support means supporting the cutting means with said support means being capable of lateral movement while permitting the cutting means to remain substantially perpendicular to the laminate web;

a movable base to which said support means is connected and means to urge the cutting means against the edge of the carrier layer of the laminate web;

a cutting means holder, said support means disposed on either side of the cutting means holder, said support means supporting the cutting means and said cutting means holder with said support means and said movable base forming a parallelogram-like structure; and wherein said support means consists of leaf springs.

2. An edge trimming device for use in trimming a moving laminate web which includes a carrier layer and at least one outer layer comprising:

cutting means for cutting an edge portion of the laminate web;

resiliently biased support means supporting the cutting means with said support means being capable of lateral movement while permitting the cutting means to remain substantially perpendicular to the laminate web; and wherein the support means comprises two parallel rigid links connected by a diagonally extending spring.

3. The edge trimming device of claim 2 wherein the tension of said diagonally extending spring is adjustable.

4. An edge trimming device for use in trimming a moving laminate web which includes a carrier layer and at least one outer layer comprising:

a substantially flat cutting blade;

a holder, means mounting said cutting blade on said holder;

a base; and a pair of links spaced apart from each other and connecting said holder to said base, said blade being positioned on said holder between said links, said links including means for resiliently biasing said holder to resist lateral movement whereby upon lateral displacement of said holder, said cutting blade is urged against an edge portion of the carrier layer while said cutting blade remains substantially perpendicular to the laminate web so that said cutting blade can cut off an edge portion of the at least one outer layer while being moved laterally by the edge portion of the carrier layer of the laminate web.

5. The edge trimming device of claim 4 wherein said link means include leaf springs, and wherein said holder said leaf springs and said movable base together form a parallelogram-like resilient structure.

* * * * *